(12) United States Patent
Watanabe

(10) Patent No.: US 10,904,422 B2
(45) Date of Patent: Jan. 26, 2021

(54) APPARATUS AND METHOD FOR CONTROLLING A PLURALITY OF SLAVE COMMUNICATION APPARATUSES BASED ON STATE INFORMATION

(71) Applicant: CANON KABUSHIKI KAISHA, Tokyo (JP)

(72) Inventor: Hajime Watanabe, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 136 days.

(21) Appl. No.: 16/022,842

(22) Filed: Jun. 29, 2018

(65) Prior Publication Data
US 2019/0014254 A1   Jan. 10, 2019

(30) Foreign Application Priority Data

Jul. 7, 2017 (JP) ................................. 2017-133981

(51) Int. Cl.
*G06F 15/16* (2006.01)
*H04N 5/232* (2006.01)
(Continued)

(52) U.S. Cl.
CPC ... *H04N 5/23206* (2013.01); *H04L 29/08351* (2013.01); *H04L 67/1051* (2013.01);
(Continued)

(58) Field of Classification Search
CPC ............. H04N 5/23206; H04N 5/2354; H04N 5/2256; H04N 5/23245; H04N 2201/0013; H04N 5/23209; H04N 5/232; H04N 5/772; H04N 5/23203; H04N 5/247; H04N 5/765; H04W 40/244; H04W 76/15; H04W 84/20; G03B 15/05; G03B 2215/0557; H04L 29/08351; H04L 67/1051
(Continued)

(56) References Cited

U.S. PATENT DOCUMENTS

2004/0204046 A1* 10/2004 Bonta .................... H04W 84/20
                                                                 455/556.1
2005/0086273 A1*  4/2005 Loebbert ............... H04W 84/20
(Continued)

FOREIGN PATENT DOCUMENTS

JP        2011-095473 A        5/2011
JP        2015219325 A   * 12/2015

*Primary Examiner* — Johnny B Aguiar
(74) *Attorney, Agent, or Firm* — Cowan, Liebowitz & Latman, P.C.

(57) ABSTRACT

There is provided a master communication apparatus. A selection unit selects a representative slave from a plurality of slave communication apparatuses. A notification unit notifies the plurality of slave communication apparatuses of the representative slave. Each of the plurality of slave communication apparatuses is configured to, if it is not the representative slave, transmit state information that indicates a state of the slave communication apparatus to the representative slave. A reception unit receives the state information of the plurality of the slave communication apparatuses from the representative slave. A transmission unit transmits a control signal for controlling the plurality of slave communication apparatuses based on the state information.

14 Claims, 15 Drawing Sheets

(51) Int. Cl.
*H04W 76/15* (2018.01)
*H04N 5/225* (2006.01)
*H04W 40/24* (2009.01)
*H04N 5/235* (2006.01)
*H04L 29/08* (2006.01)
*H04W 84/20* (2009.01)

(52) U.S. Cl.
CPC ......... *H04N 5/2256* (2013.01); *H04N 5/2354* (2013.01); *H04W 40/244* (2013.01); *H04W 76/15* (2018.02); *H04N 5/23245* (2013.01); *H04W 84/20* (2013.01)

(58) Field of Classification Search
USPC ................ 709/208, 209, 213, 220, 221, 224
See application file for complete search history.

(56) References Cited

U.S. PATENT DOCUMENTS

| | | | | |
|---|---|---|---|---|
| 2011/0107128 | A1* | 5/2011 | Otani | G06F 3/122 |
| | | | | 713/321 |
| 2013/0178219 | A1* | 7/2013 | Lee | H04W 72/04 |
| | | | | 455/450 |
| 2013/0193853 | A1* | 8/2013 | Gouji | H05B 37/02 |
| | | | | 315/130 |
| 2014/0267748 | A1* | 9/2014 | Lee | H04N 7/181 |
| | | | | 348/159 |
| 2014/0334375 | A1* | 11/2014 | Sugitani | H04W 84/20 |
| | | | | 370/315 |
| 2018/0089413 | A1* | 3/2018 | Fukuhara | G06F 21/44 |

\* cited by examiner

SLAVE STROBOSCOPE

F I G. 6A

| SLAVE ID | 1 | 2 | 3 | 4 | 5 | 6 | 7 | 8 | 9 | 10 |
|---|---|---|---|---|---|---|---|---|---|---|
| LINK | 1 | 1 | 1 | 0 | 0 | 0 | 0 | 0 | 0 | 0 |
| CHARGE INFORMATION | 0 | 0 | 0 | 0 | 0 | 0 | 0 | 0 | 0 | 0 |
| REMAINING BATTERY CHARGE | 0 | 0 | 0 | 0 | 0 | 0 | 0 | 0 | 0 | 0 |

F I G. 6B

| SLAVE ID | 1 | 2 | 3 | 4 | 5 | 6 | 7 | 8 | 9 | 10 |
|---|---|---|---|---|---|---|---|---|---|---|
| LINK | 1 | 1 | 1 | 0 | 0 | 0 | 0 | 0 | 0 | 0 |
| CHARGE INFORMATION | 1 | 1 | 1 | 0 | 0 | 0 | 0 | 0 | 0 | 0 |
| REMAINING BATTERY CHARGE | 3 | 2 | 1 | 0 | 0 | 0 | 0 | 0 | 0 | 0 |

F I G. 6C

| 2 BYTES | 1 BYTE | 2 BYTES | 1 BYTE |
|---|---|---|---|
| NETWORK ID | NO. OF SLAVES | PRESENCE/ABSENCE of IDs 1-10 | REPRESENTATIVE SLAVE ID |
| NETWORK IDENTIFICATION | NO. OF SLAVES JOINING IN THE NETWORK | INFORMATION ON SLAVE IDs JOINING IN THE NETWORK | REPRESENTATIVE SLAVE ID |

F I G. 6D

| 2 BYTES | 1 BYTE | 2 BYTES | 1 BYTE |
|---|---|---|---|
| 0001h | 03h | 0007h (0000000000000111b) | 01h |
| NETWORK IDENTIFICATION | NO. OF SLAVES JOINING IN THE NETWORK | INFORMATION ON SLAVE IDs JOINING IN THE NETWORK | REPRESENTATIVE SLAVE ID |

FIG. 7A

| DATA LENGTH | 2 BYTES |
|---|---|
| COMMAND | 2 BYTES |
| DATA | VARIABLE |

FIG. 7B

| DATA LENGTH | 4 BYTES | 2 BYTES |
|---|---|---|
| COMMAND | OBTAIN STROBOSCOPE INFORMATION | 2 BYTES |
| DATA | CHARGE INFORMATION | 1 BYTE |
| | REMAINING BATTERY CHARGE | 1 BYTE |

FIG. 7C

| DATA LENGTH | | 35 BYTES | 2 BYTES |
|---|---|---|---|
| COMMAND | | OBTAIN STROBOSCOPE INFORMATION | 2 BYTES |
| DATA | MASTER | CHARGE INFORMATION | 1 BYTE |
| | | REMAINING BATTERY CHARGE | 1 BYTE |
| | | GROUP | 1 BYTE |
| | SLAVE 1 | CHARGE INFORMATION | 1 BYTE |
| | | REMAINING BATTERY CHARGE | 1 BYTE |
| | | GROUP | 1 BYTE |
| | SLAVE 2 | CHARGE INFORMATION | 1 BYTE |
| | | REMAINING BATTERY CHARGE | 1 BYTE |
| | | GROUP | 1 BYTE |
| | ⋮ | | |
| | SLAVE 10 | CHARGE INFORMATION | 1 BYTE |
| | | REMAINING BATTERY CHARGE | 1 BYTE |
| | | GROUP | 1 BYTE |

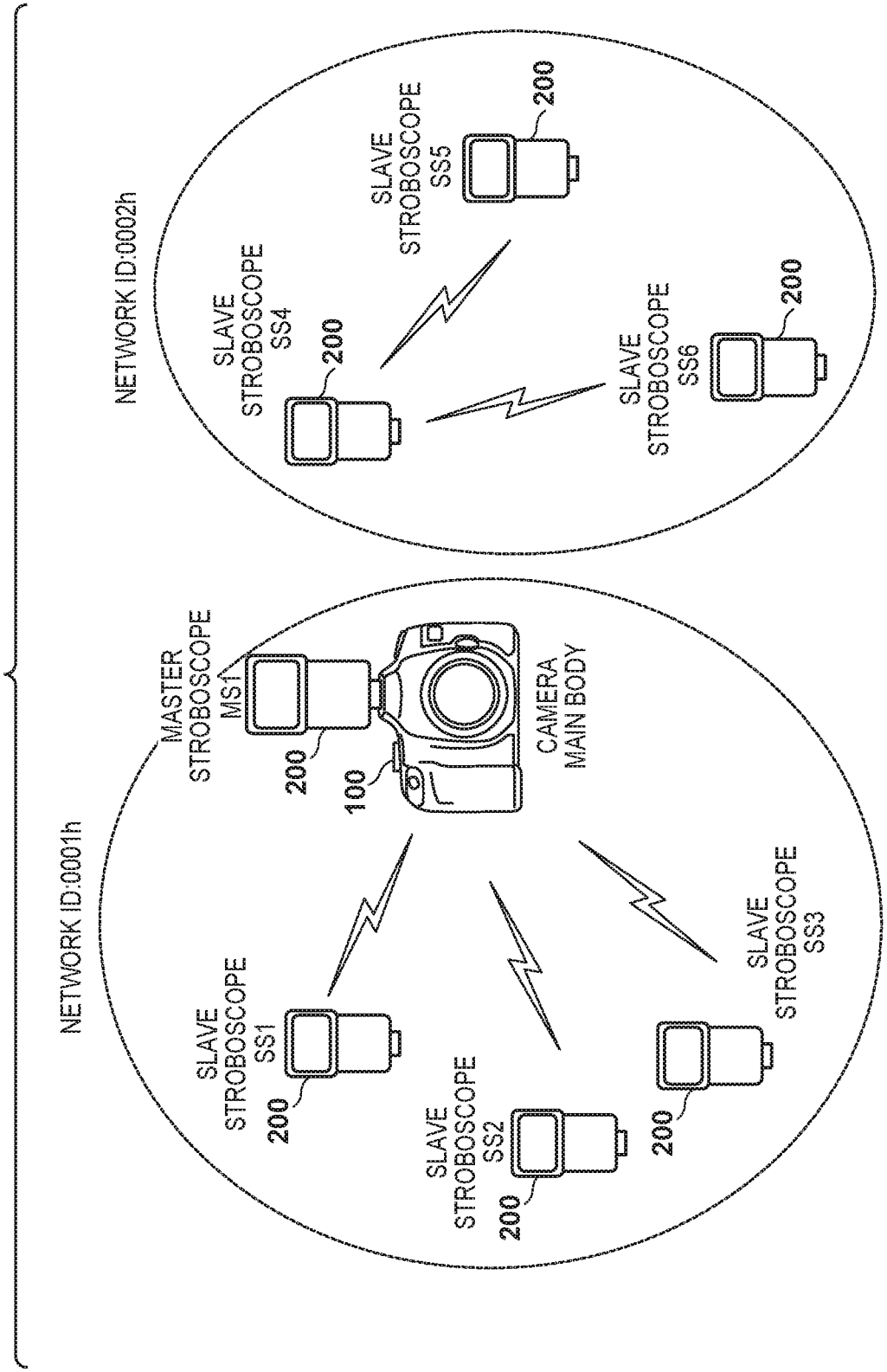

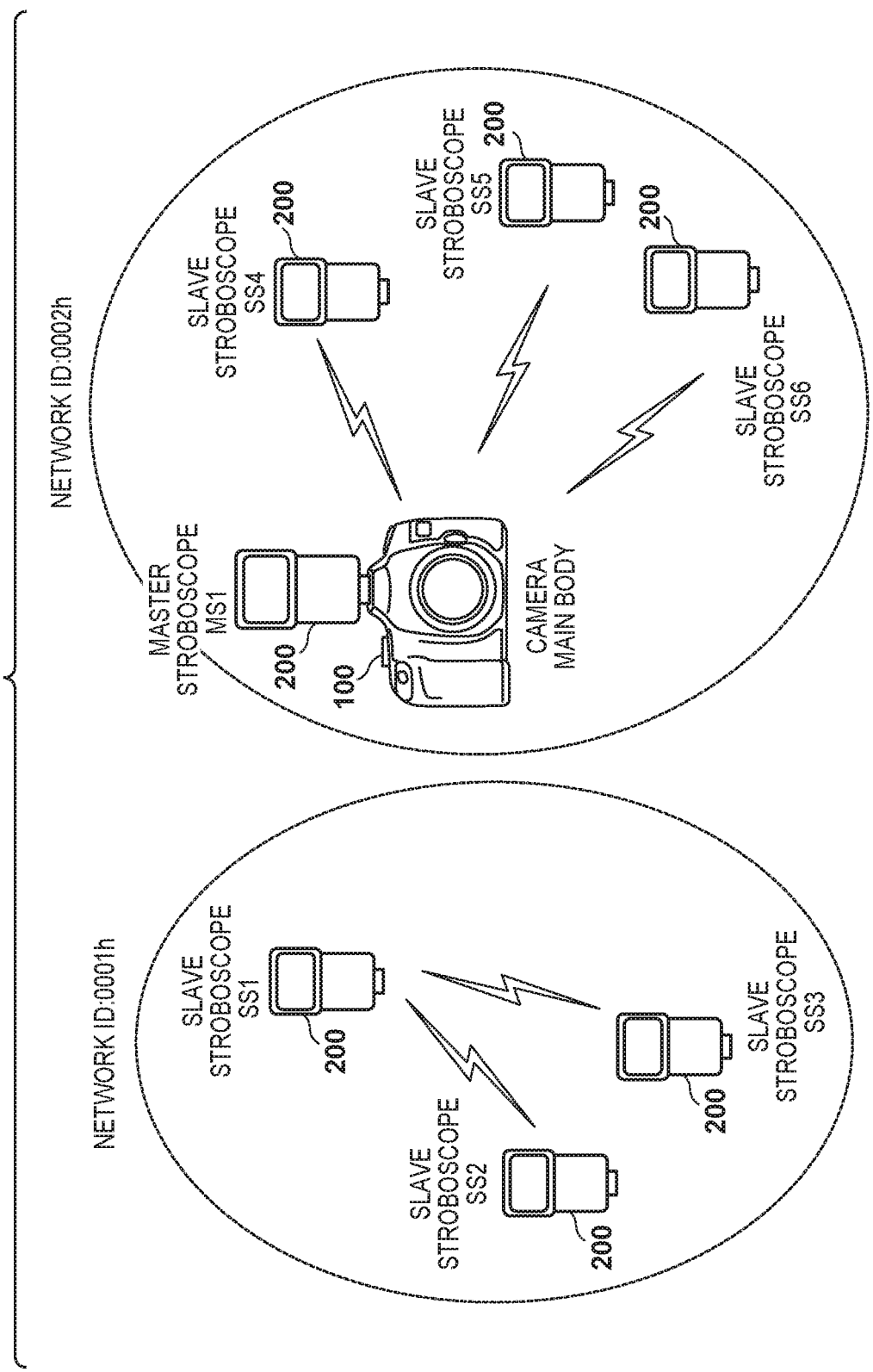

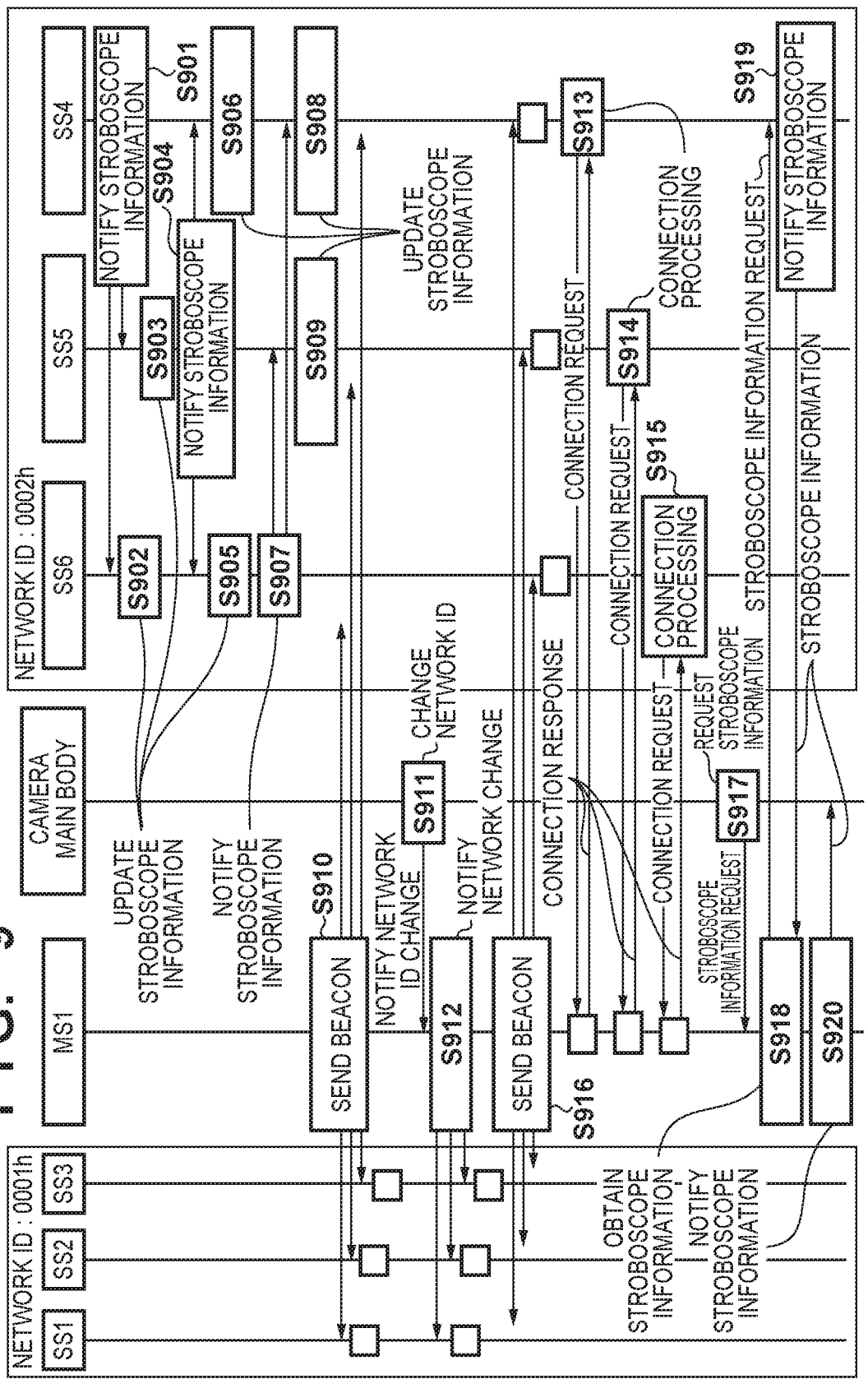

APPARATUS AND METHOD FOR CONTROLLING A PLURALITY OF SLAVE COMMUNICATION APPARATUSES BASED ON STATE INFORMATION

BACKGROUND OF THE INVENTION

Field of the Invention

The present invention relates to a master communication apparatus, a slave communication apparatus, and a control method.

Description of the Related Art

In recent years, with communication apparatuses that use radio waves becoming widespread, it has been proposed to apply such communication apparatuses to stroboscopes so as to develop a multi-stroboscopic flash control system capable of two-way communication between the stroboscopes.

In such a multi-stroboscopic flash control system capable of two-way communication, the stroboscope that serves as a master (master stroboscope) or the camera can obtain information from a stroboscope that serves as a slave (slave stroboscope). This allows the user to check various information, such as the charge state of the slave stroboscope, using a display member of the camera or the master stroboscope. This reduces failure resulting from shooting when the slave stroboscopes cannot fire a flash.

One example of a multi-stroboscopic flash control system capable of two-way communication using radio waves is disclosed in Japanese Patent Laid-Open No. 2011-95473, which discloses a multi-stroboscopic flash control system that switches between a plurality of master stroboscopes during use.

Since the master stroboscope performs overall control of the multi-stroboscopic flash control system, exchange of setting information with the camera, and the like, the master stroboscope has a relatively high processing load. As such, if the master stroboscope is configured to separately obtain information from all the slave stroboscopes, the processing load of the master stroboscope and/or the time required to complete obtaining information from all the slave stroboscopes may increase in proportion to the number of the slave stroboscopes. Japanese Patent Laid-Open No. 2011-95473, however, does not give consideration to these problems.

SUMMARY OF THE INVENTION

The present invention was made in the light of the foregoing circumstances and provides technology to reduce the processing load of a master communication apparatus in processing in which the master communication apparatus obtains slave information of a plurality of slave communication apparatuses.

According to a first aspect of the present invention, there is provided a master communication apparatus, comprising: a selection unit configured to select a representative slave from a plurality of slave communication apparatuses; a notification unit configured to notify the plurality of slave communication apparatuses of the representative slave, wherein each of the plurality of slave communication apparatuses is configured to, if it is not the representative slave, transmit state information that indicates a state of the slave communication apparatus to the representative slave; a reception unit configured to receive the state information of the plurality of the slave communication apparatuses from the representative slave; and a transmission unit configured to transmit a control signal for controlling the plurality of slave communication apparatuses based on the state information.

According to a second aspect of the present invention, there is provided a slave communication apparatus, comprising: a first reception unit configured to receive a notification from a master communication apparatus, the notification indicating a representative slave selected from a plurality of slave communication apparatuses including this slave communication apparatus; a second reception unit configured to, if this slave communication apparatus is selected as the representative slave, receive, from each of other slave communication apparatus, state information that indicates a state of the slave communication apparatus; and a transmission unit configured to transmit the state information of the plurality of slave communication apparatuses to the master communication apparatus if this slave communication apparatus is selected as the representative slave, and transmit state information of this slave communication apparatus to the representative slave if this slave communication apparatus is not selected as the representative slave, wherein the slave communication apparatus operates upon receiving a control signal based on the state information from the master communication apparatus.

According to a third aspect of the present invention, there is provided a control method executed by a master communication apparatus, comprising: selecting a representative slave from a plurality of slave communication apparatuses; notifying the plurality of slave communication apparatuses of the representative slave, wherein each of the plurality of slave communication apparatuses is configured to, if it is not the representative slave, transmit state information that indicates a state of the slave communication apparatus to the representative slave; receiving the state information of the plurality of the slave communication apparatuses from the representative slave; and transmitting a control signal for controlling the plurality of slave communication apparatuses based on the state information.

According to a fourth aspect of the present invention, there is provided a control method executed by a slave communication apparatus, comprising: receiving a notification from a master communication apparatus, the notification indicating a representative slave selected from a plurality of slave communication apparatuses including this slave communication apparatus; if this slave communication apparatus is selected as the representative slave, receiving, from each of other slave communication apparatus, state information that indicates a state of the slave communication apparatus; and transmitting the state information of the plurality of slave communication apparatuses to the master communication apparatus if this slave communication apparatus is selected as the representative slave, and transmitting state information of this slave communication apparatus to the representative slave if this slave communication apparatus is not selected as the representative slave, wherein the slave communication apparatus operates upon receiving a control signal based on the state information from the master communication apparatus.

Further features of the present invention will become apparent from the following description of exemplary embodiments with reference to the attached drawings.

BRIEF DESCRIPTION OF THE DRAWINGS

FIGS. 6A and 6B are diagrams showing management tables of the wireless multi-stroboscopic flash system managed by the master stroboscope MS1.

FIGS. 6C and 6D are diagrams showing beacon frames.

FIGS. 7A to 7C are diagrams showing configurations of stroboscope information given by the master stroboscope MS1 to the camera main body 100.

FIG. 8A shows a configuration of a wireless multi-stroboscopic flash system according to a second embodiment.

FIG. 8B shows a configuration of a wireless multi-stroboscopic flash system according to the second embodiment.

FIG. 9 is a diagram showing a sequence of processing in which the master stroboscope MS1 switches between the wireless multi-stroboscopic flash systems to obtain information of each of the slave stroboscopes, according to the second embodiment.

DESCRIPTION OF THE EMBODIMENTS

Hereinafter, embodiments of the present invention will be described with reference to the attached drawings. It should be noted that the technical scope of the present invention is defined by the claims, and is not limited by the following respective embodiments. Also, not all of the combinations of the aspects that are described in the embodiments are necessarily essential to the present invention. Also, the aspects that are described in the respective embodiments can be combined as appropriate.

First Embodiment

Figure 1:
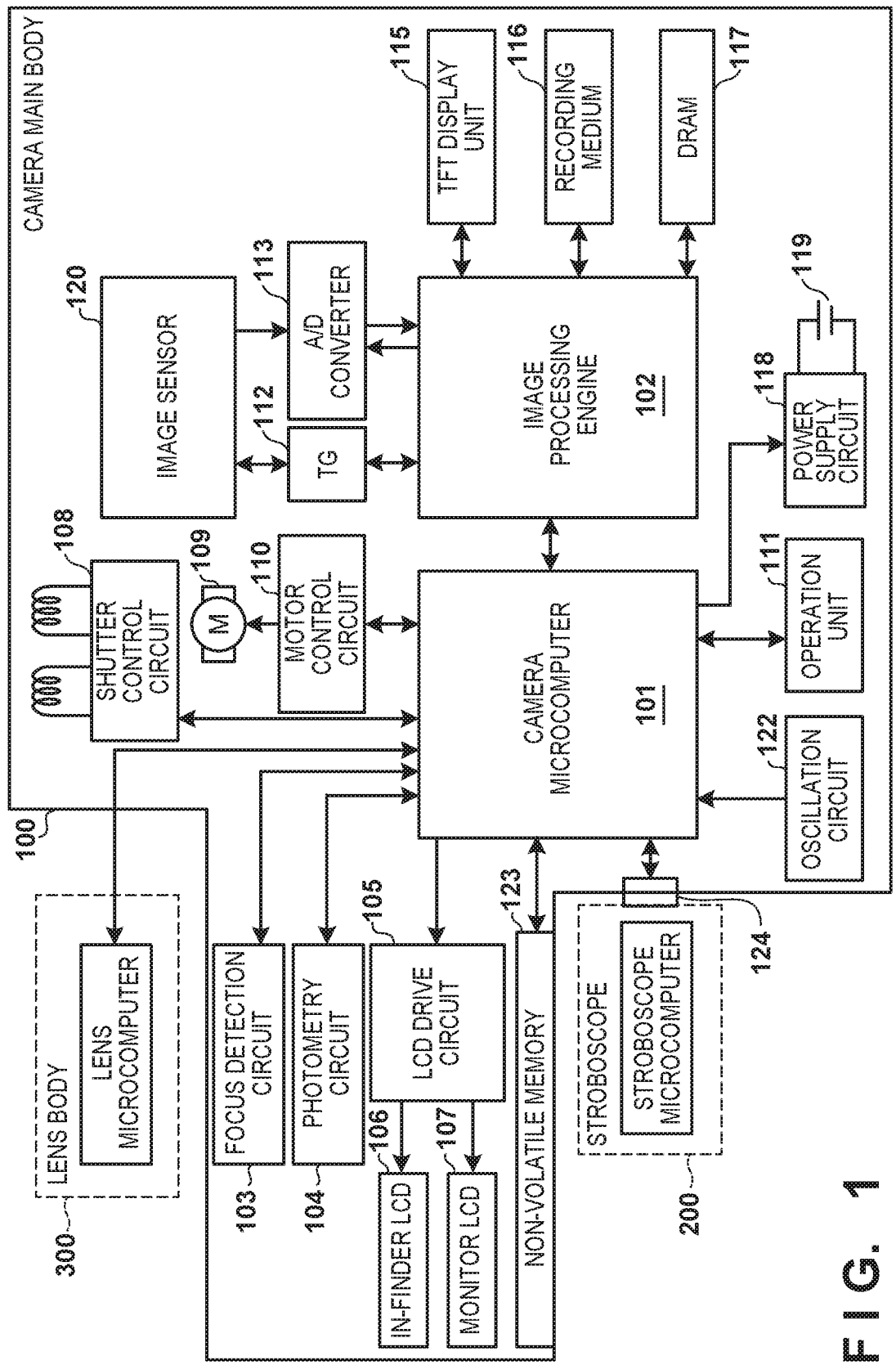
FIG. 1 is a block diagram showing the configuration of a camera main body 100.

FIG. 1 is a block diagram showing a configuration of a camera main body 100. A camera microcomputer 101 shown in FIG. 1 is a main microcomputer that controls the operation of the camera main body 100, and performs various functions, such as power supply control, switch control, lens control, photometry control, ranging control, shutter control, and communication control.

The camera microcomputer 101 is connected to a power supply circuit 118, a release button (SW1 and SW2) (not shown), an operation unit 111 for operating a later-described GUI (graphical user interface), and an oscillation circuit 122. The camera microcomputer 101 is also connected to a focus detection circuit 103, a photometry circuit 104, an LCD drive circuit 105, a shutter control circuit 108, a motor control circuit 110 for controlling a motor 109, and an image processing engine 102, and the like. In addition, the camera microcomputer 101 communicates with a lens microcomputer contained in an exchangeable lens body 300 via lens mount contacts (not shown). A battery 119 is connected to the power supply circuit 118.

According to signals from the camera microcomputer 101, the focus detection circuit 103 performs accumulation control and read-out control of a range sensor and outputs pixel information to the camera microcomputer 101. In this way, the focus can be detected using a known phase difference detection method. The camera microcomputer 101 performs auto focusing (AF) based on focus detection information by transmitting and receiving signals to and from the lens body 300.

The photometry circuit 104 sends a luminance signal from a photometric sensor to the camera microcomputer 101 as a luminance signal of an object. The camera microcomputer 101 performs exposure control (AE) by computing the aperture value, the shutter speed, etc.

The shutter control circuit 108 performs an exposure operation in which two shutter drive magnets constituting a focal plane shutter are controlled according to signals from the camera microcomputer 101 to cause two shutter curtains called a front curtain and a rear curtain (not shown) to travel.

The SW1 is turned on at the first stroke of the release button and functions as a switch for starting AE and AF. The SW2 is turned on at the second stroke of the release button and functions as a switch for starting the exposure operation. The camera microcomputer 101 detects signals from the SW1, the SW2, and the operation unit 111.

The LCD drive circuit 105 controls the display on an in-finder LCD 106 and a monitor LCD 107 according to signals from the camera microcomputer 101.

The image processing engine 102 is a processor that mainly performs digital image processing and performs accumulation control and read-out control of the image sensor 120 via a TG 112 (timing generator). An analog-digital converter 113 performs analog-digital conversion on the read-out image signal, which is subsequently subjected to known image processing, such as color interpolation processing, white balance processing, and gamma processing. The image signal is eventually converted into digital image data, such as that in the JPEG format, and is temporarily stored in the DRAM 117, displayed on a TFT display unit 115 in a quick review mode, and further stored in a recording medium 116. Also displayed on the TFT display unit 115 is a GUI for making various settings. The user can make various settings of the camera main body 100 and the stroboscope 200 by operating the GUI using the operation unit 111.

A non-volatile memory 123 stores the control program executed by the camera microcomputer 101, various data, and the like. Reference numeral 124 denotes an interface between the camera main body 100 and the stroboscope 200, and the camera main body 100 can communicate with the stroboscope 200, which is detachably attached to the camera main body 100, via the interface 124.

Figure 2:
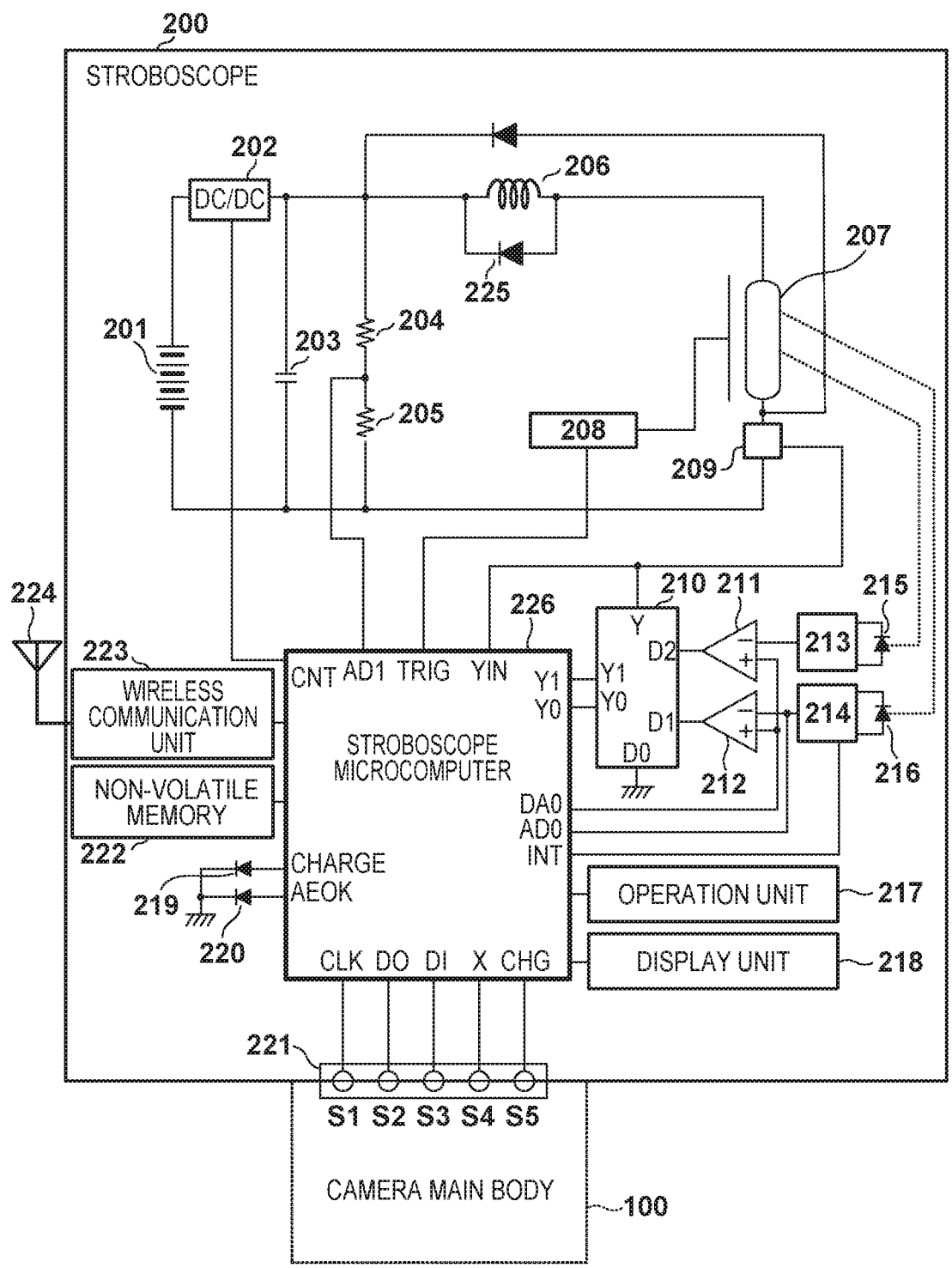
FIG. 2 is a block diagram showing the configuration of a stroboscope 200.

The configuration of the stroboscope 200 will be described in detail hereinafter with reference to FIG. 2. In FIG. 2, reference numeral 201 denotes a battery used as a power source, reference numeral 202 denotes a booster circuit that boosts the voltage of the battery 201 to hundreds of volts, and reference numeral 203 denotes a main capacitor that accumulates electric energy that is the output of the booster circuit 202. Reference numerals 204 and 205 denote resistors that divide the voltage of the main capacitor 203 at a predetermined ratio and are connected to an AD1 input terminal of a stroboscope microcomputer 226. Reference numeral 206 denotes a coil for limiting the light emission current, and reference numeral 225 denotes a diode for absorbing the reverse voltage generated at the end of light emission. Reference numeral 207 denotes a discharge tube for firing a flash; reference numeral 208 denotes a trigger circuit for exciting the discharge tube 207 to emit light; and reference numeral 209 denotes a light emission control circuit for controlling the emission of light from the discharge tube 207.

Reference numeral 210 denotes a data selector that selects D0, D1, or D2 based on a combination of the two inputs Y0 and Y1 and outputs the selection to the Y terminal. Reference numeral 211 denotes a comparator for controlling the light intensity of flat light emission and reference numeral 212 denotes a comparator for controlling the amount of light emission during flashing. Reference numeral 215 denotes a photodiode that serves as a light receiving sensor for controlling flat light emission and monitors the light output of the discharge tube 207. Reference numeral 213 denotes a photometry circuit for amplifying the minute current flowing to the photodiode 215 and converting a photoelectric current into a voltage. Reference numeral 216 denotes a photodiode that serves as a light receiving sensor for controlling flash emission and monitors the light output of the discharge tube 207. Reference numeral 214 denotes a photometric integrating circuit for logarithmically compressing a photoelectric current flowing to the photodiode 216 and for compressively integrating the amount of light emission of the discharge tube 207.

Reference numeral 217 denotes an operation unit for setting the operation mode (a normal mode, a master mode, and a slave mode) of the stroboscope 200, and reference numeral 218 denotes a display unit that includes an LED and the like for displaying the operating state of the stroboscope. Reference numeral 219 denotes an LED for displaying that the stroboscope 200 is at no less than a predetermined charge voltage level at which light emission is possible, and reference numeral 220 denotes an LED for displaying the link state of wireless communication performed by a wireless communication unit 223, which will be described below.

Reference numeral 221 denotes an interface between the stroboscope 200 and the camera main body 100, and the stroboscope 200 can communicate with the camera main body 100 via the interface 221. The interface 221 is connected to the CLK terminal, the DO terminal, the DI terminal, the X terminal, and the CHG terminal of the stroboscope microcomputer 226. The CLK terminal receives input of a communication clock of the camera main body 100, and the DO terminal transmits data from the stroboscope microcomputer 226 to the camera microcomputer 101 in synchronization with the CLK terminal. The DI terminal receives data from the camera microcomputer 101 in synchronization with the CLK terminal. The X terminal is a terminal for a light emission start signal. The CHG terminal is a terminal for notifying the camera microcomputer 101 as to whether or not the stroboscope 200 is ready to emit light.

Reference numeral 222 denotes a non-volatile memory that stores the control program executed by the stroboscope microcomputer 226, various data, and the like. Reference numeral 223 denotes a wireless communication unit that includes a known RF chip that handles wireless protocols, such as ZigBee® or Bluetooth®, for sending and receiving signals in the 2.4 GHz band (ISM band). Reference numeral 224 denotes an antenna for sending and receiving electromagnetic waves. Control signals are transmitted between the master stroboscope and the slave stroboscope by sending and receiving wireless communication packets via the wireless communication unit 223 and the antenna 224.

Reference numeral 226 denotes a microcomputer (stroboscope microcomputer) that performs overall control of the operation of the stroboscope 200 and has a built-in analog-digital converter and the like. From the non-volatile memory 222, the stroboscope microcomputer 226 reads the control program for performing light emission operation and adjustment values for performing various types of control.

It should be noted that although the wireless communication unit 223 is included in the stroboscope 200 in this embodiment, alternatively, it may be included in the camera main body 100. Furthermore, the stroboscope 200 itself may be included in the camera main body 100.

Figure 3:
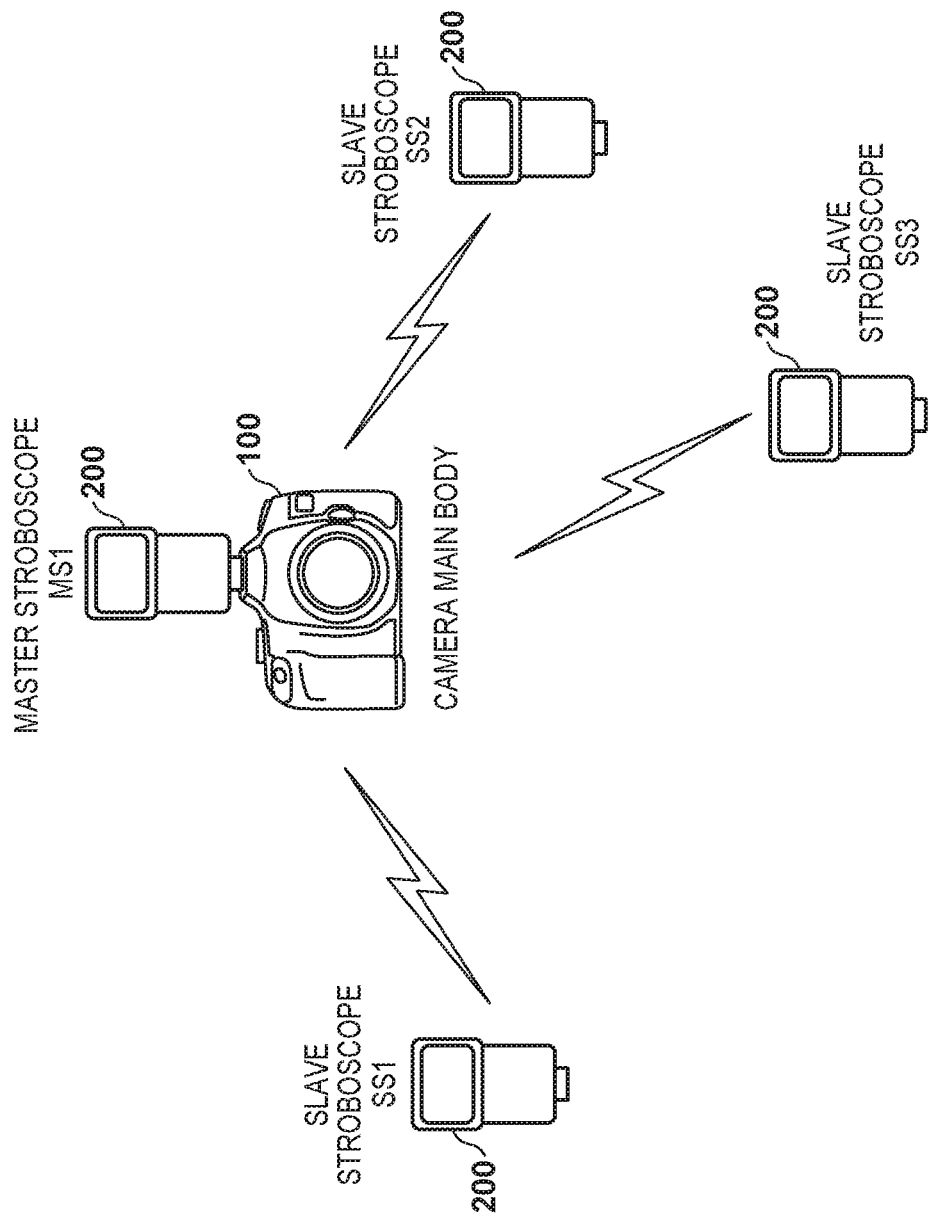
FIG. 3 shows a configuration of a wireless multi-stroboscopic flash system according to a first embodiment.

A wireless multi-stroboscopic flash system that includes the camera main body 100 and a plurality of stroboscopes 200 will be described hereinafter with reference to FIG. 3. Each of the plurality of stroboscopes 200 in FIG. 3 is assigned the role of a master or a slave. The master stroboscope controls the slave stroboscopes and transmits a light emission instruction to the slave stroboscopes. The slave stroboscopes are controlled by the master stroboscope and perform light emission processing upon receiving a light emission instruction from the master stroboscope.

In FIG. 3, one master stroboscope MS1 and three slave stroboscopes SS1, SS2, and SS3 constitute the wireless multi-stroboscopic flash system. The wireless communication unit 223 and the antenna 224 of each stroboscope 200 set up a wireless communication link and establish a wireless network. The master stroboscope MS1 is connected to the camera main body 100 via the interfaces 124 and 211 and can mutually communicate with the camera main body 100. It should be noted that in the following description of this embodiment, it is assumed that a maximum of ten slave stroboscopes can join in the wireless network.

Figure 4A:
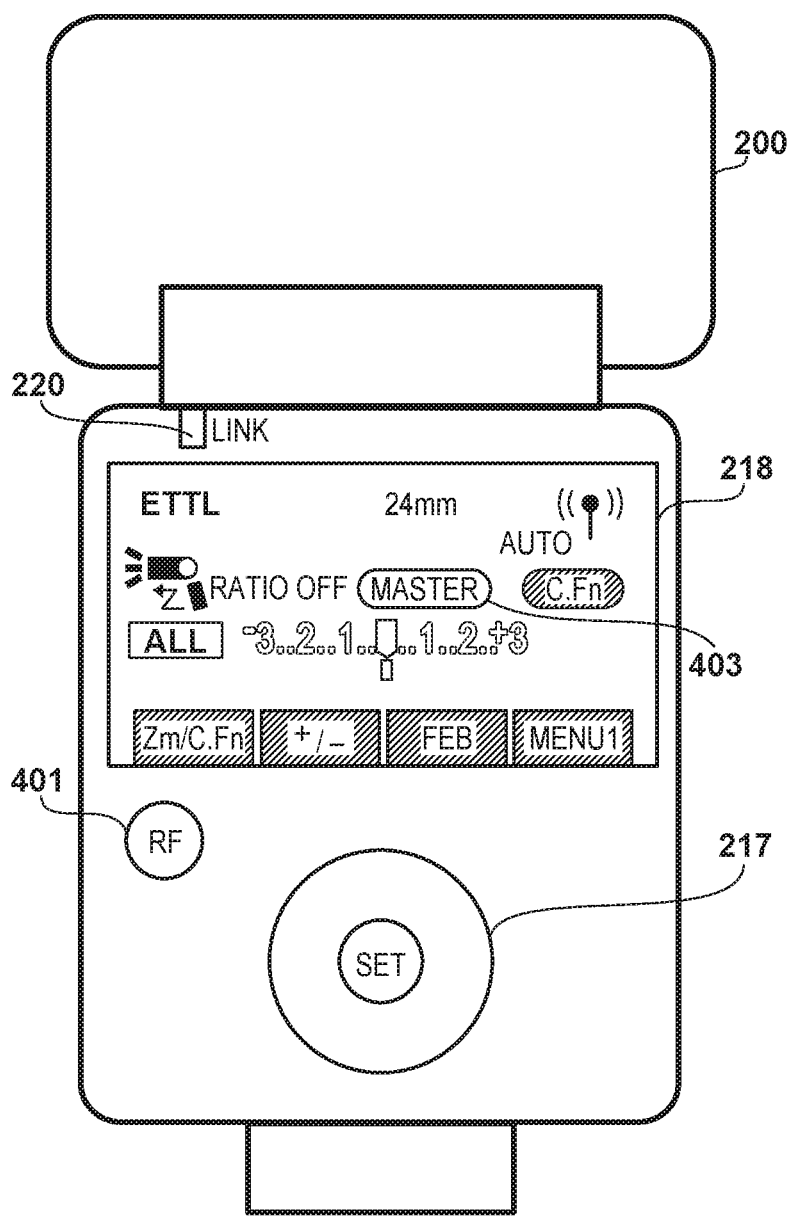
FIGS. 4A and 4B are diagrams illustrating an operation unit 217 and a display unit 218 of the stroboscope 200.
Figure 4B:
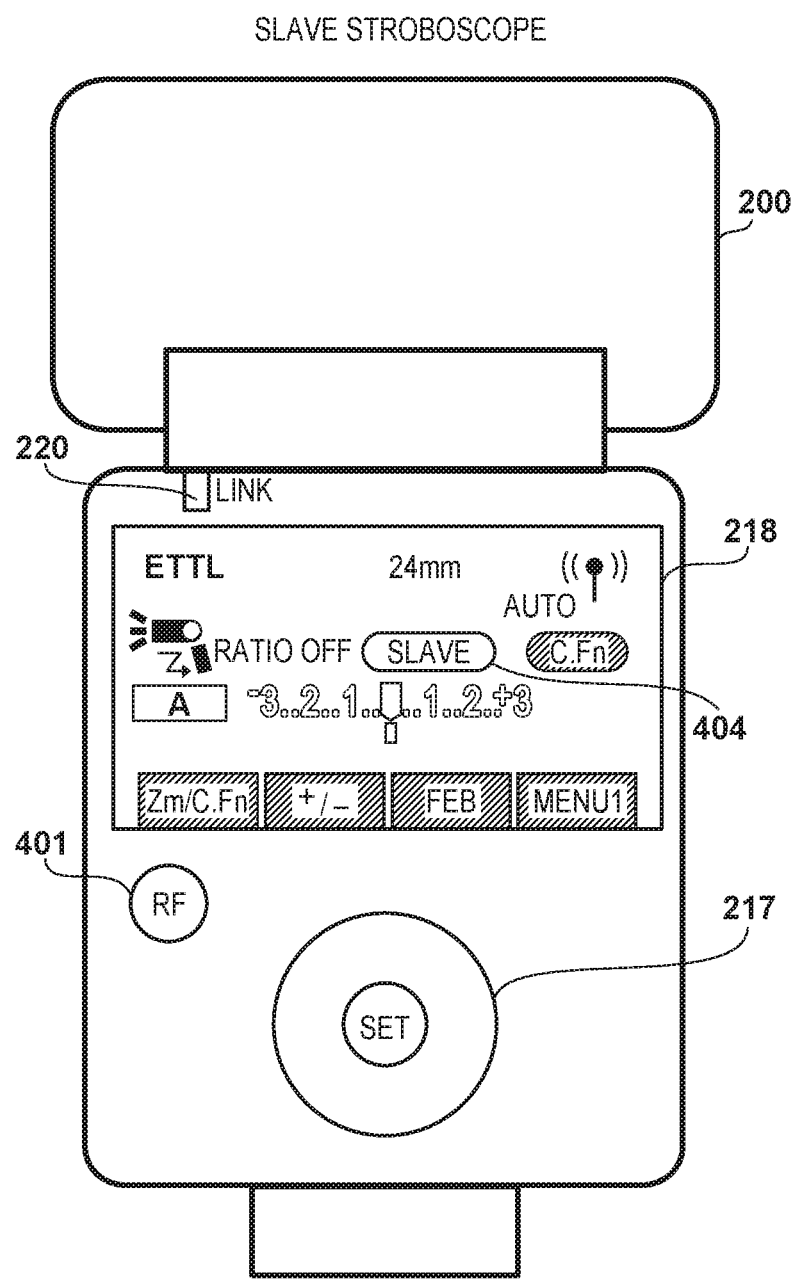

FIGS. 4A and 4B are diagrams for illustrating the operation unit 217 and the display unit 218 of the stroboscope 200. The operation unit 217 includes a rotary operating member and a pushdown-type button member (SET button). The user can operate the rotary operating member to display a desired settings menu and can press the SET button disposed at the center of the rotary operating member to finalize a selection on the settings menu. The RF button 401 constitutes part of the operation unit 217 and is used to select the operation mode of the stroboscope 200 from a master mode, a slave mode, or a normal mode. In the master mode, the stroboscope 200 operates as a master stroboscope, and in the slave mode, the stroboscope 200 operates as a slave stroboscope. When in the normal mode, the stroboscope 200 does not use wireless communication. Each time the RF button 401 is pressed, the operation mode of the stroboscope switches between the master mode, the slave mode, and the normal mode, in that order.

FIG. 4A shows the case in which the master mode has been selected with a "MASTER" icon 403 displayed on the display unit 218. FIG. 4B shows the case in which the slave mode has been selected with a "SLAVE" icon 404 displayed on the display unit 218. The LED 220 is controlled to be illuminated when a wireless communication link is established between the master stroboscope and the slave stroboscopes. When no wireless communication link is established, the LED 220 is controlled to flash on and off or be illuminated in a color different from that used when a link is established. With this configuration, the LED 220 can indicate to the user the link state of the wireless communication.

In addition, the settings menu displayed on the display unit 218 is also used to set a network ID. A network ID is an ID for identifying the wireless network that the stroboscope 200 joins in, and a plurality of stroboscopes 200 having the same network ID can wirelessly communicate among themselves.

Figure 5A:
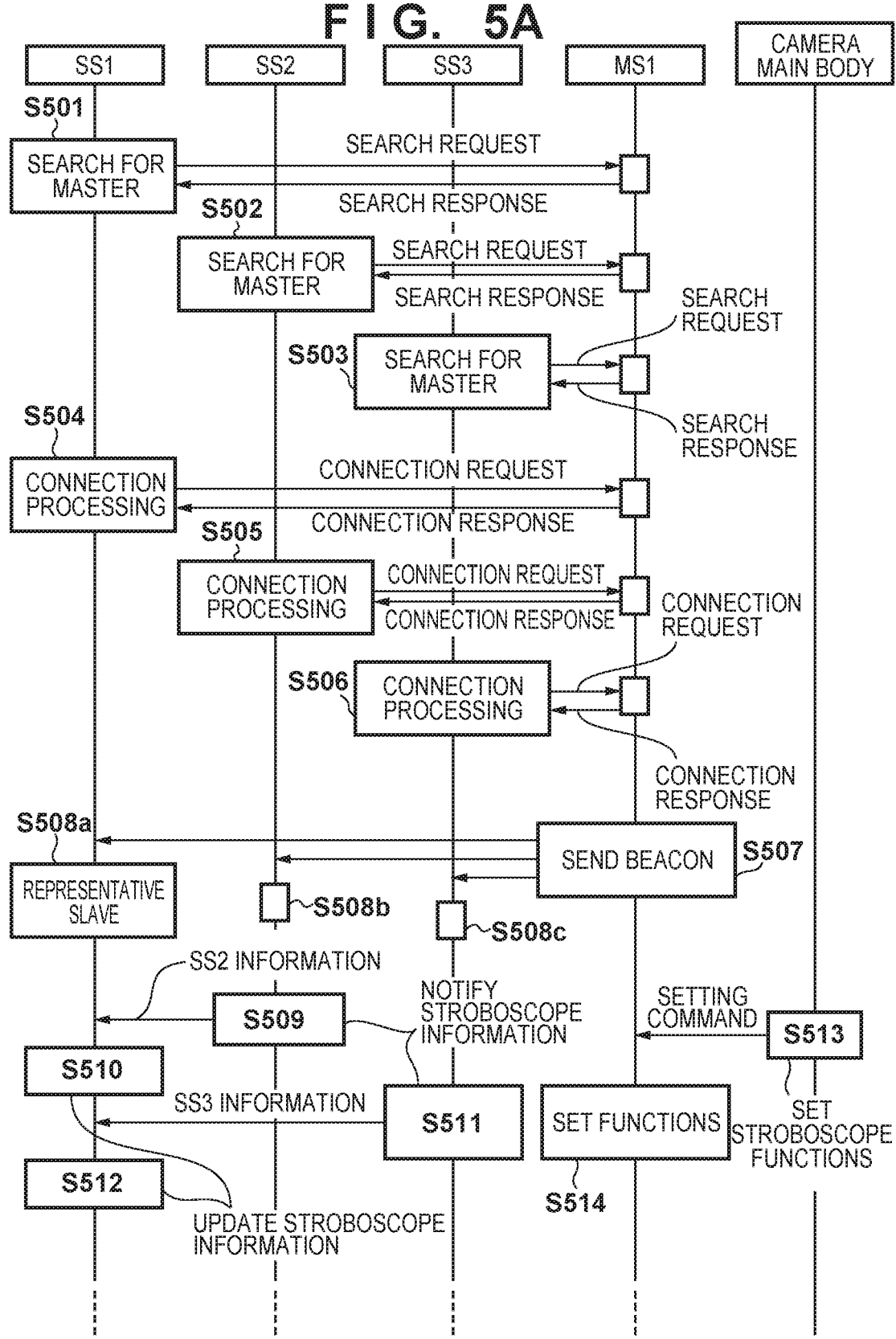
FIG. 5A is a diagram showing a sequence of processing in which a master stroboscope MS1 obtains information from slave stroboscopes SS1, SS2, and SS3, according to the first embodiment.
Figure 5B:
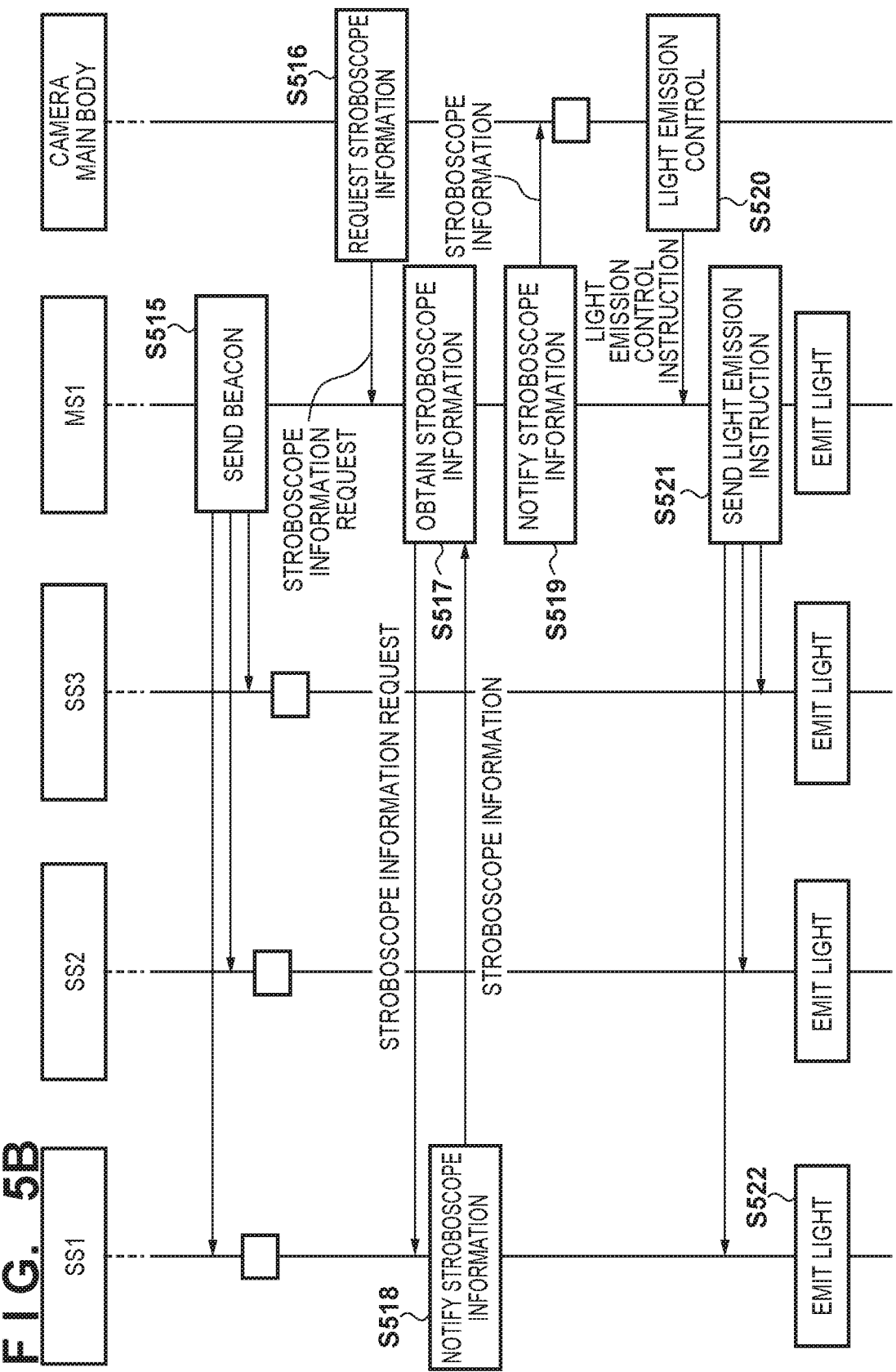
FIG. 5B is a diagram showing a sequence of processing in which the master stroboscope MS1 obtains information from the slave stroboscopes SS1, SS2, and SS3, according to the first embodiment.

Referring now to FIGS. 5A and 5B, the sequence of processing in which the master stroboscope MS1 obtains information from the slave stroboscopes SS1, SS2, and SS3 will be described hereinafter. Unless otherwise specified, the processing of the steps performed by the master stroboscope MS1 and the slave stroboscopes SS1, SS2, and SS3 shown in FIGS. 5A and 5B are performed by the respective stroboscope microcomputers 226 executing the control program. Additionally, unless otherwise specified, the processing of the steps performed by the camera main body 100 are performed by the camera microcomputer 101 executing the control program.

Upon being set to the slave mode, each of the stroboscopes 200 starts searching for the master stroboscope. Initially, in step S501, the slave stroboscope SS1 transmits a search request packet to search for the master stroboscope. The slave stroboscope SS1 is configured to periodically transmit a search request packet. The search request packet contains a network ID. The master stroboscope MS1, upon receiving a search request packet that contains a network ID matching its own network ID, transmits a search response packet. In steps S502 and S503, the same operation as in step S501 is performed with respect to the slave stroboscopes SS2 and SS3, respectively.

In step S504, in response to the receipt of the search response packet in step S501, the slave stroboscope SS1 transmits a connection request packet to the master stroboscope MS1 in order to join in the network. Upon receiving the connection request packet, the master stroboscope MS1 establishes a link (connection) with the slave stroboscope SS1 by assigning a slave ID to the slave stroboscope SS1 and transmitting a connection response packet that contains the slave ID to the slave stroboscope SS1. The master stroboscope MS1 assigns slave IDs from 1 to 10 to the slave stroboscopes in order of connection. In steps S505 and S506, the same operation as in step S504 is performed with respect to the slave stroboscopes SS2 and SS3, respectively.

Turning now to FIG. 6A, the management table of the wireless multi-stroboscopic flash system maintained by the master stroboscope MS1 will be described in detail hereinafter. The management table contains, for each of a maximum of ten slave stroboscopes, the link establishment state, the charge information, and information on the remaining battery charge. The master stroboscope MS1 refers to this management table to generate a beacon frame, to be described below. Furthermore, in response to a request from the camera main body 100, the master stroboscope MS1 notifies the camera main body 100 of information that indicates the states of the slave stroboscopes (stroboscope information).

In the example shown in FIG. 6A, the master stroboscope MS1 has established a link with three slave stroboscopes having slave IDs 1, 2, and 3 but has yet to obtain charge information and information about the remaining battery charge from these slave stroboscopes. The stroboscope information maintained in the management table is merely an example; and the management table may be configured to manage other types of information (e.g., the zoom value of the stroboscope light-emitting unit, the bounce angle, the presence or absence of a color filter, etc.).

Referring again to FIG. 5A, in step S507, the master stroboscope MS1 selects the representative slave and transmits a beacon. Beacons are repeatedly and periodically transmitted. In step S508a, the slave stroboscope SS1 receives the beacon and identifies the representative slave. In steps S508b and S508c, the same operation as in step S508a is performed with respect to the slave stroboscopes SS2 and SS3, respectively.

A representative stroboscope is selected, for example, based on the order of establishment of connection with the plurality of slave stroboscopes. For example, the master stroboscope MS1 may select the slave stroboscope SS1, which was the first to establish connection, as the representative slave.

A beacon frame consists of the information shown in FIG. 6C. That is, it contains the network ID; the number of slaves (that have joined in the network); the presence or absence of IDs (whether or not each slave ID has joined in the network); and the representative slave ID (the ID of the slave selected as the representative from the plurality of slaves). The role of the representative slave will be described in further detail below.

In the exemplary data of the beacon frame shown in FIG. 6D, the network ID is 0001h ("h" indicates that the ID number is hexadecimal), the number of slaves is 03h, and the presence or absence of IDs is 0007h (which corresponds to 0000000000000111 in the binary number system). The presence or absence of IDs is indicated as a binary number (bit notation) in ascending order from the least significant digit; ID=1, 2, 3, . . . . Accordingly, in this example, the slave stroboscopes with the slave IDs 1, 2, and 3 have joined in the network. In the following description, it is assumed that the slave stroboscope SS1 has the slave ID 1, the slave stroboscope SS2 has the slave ID 2, and the slave stroboscope SS3 has the slave ID 3. The representative slave ID is the stroboscope ID of one slave stroboscope selected from the slave stroboscopes that join in the network. In this embodiment, the master stroboscope MS1 selects the representative slave. In the example of FIG. 6D, the representative slave ID is 1. Accordingly, based on the received beacon, each slave stroboscope can detect that the slave stroboscope SS1 is the representative slave.

In step S509, the slave stroboscope SS2 transmits its own stroboscope information to the slave stroboscope SS1, i.e., the representative slave. In this embodiment, the stroboscope information may include, but is not limited to, charge information (fully charged state, charge voltage, etc.), information on the remaining battery charge, stroboscope setting information, the zoom value of the stroboscope light-emitting unit, the bounce angle, the presence or absence of a color filter, and the like. In the following description of this embodiment, the stroboscope information includes charge information and information on the remaining battery charge. In step S510, the slave stroboscope SS1 (the representative slave) receives stroboscope information from the slave stroboscope SS2 and updates the stroboscope information of the management table with the received information. In steps S511 and S512, the same operation as in steps S509 and S510 is performed with respect to the slave stroboscope SS3.

FIG. 6B shows an example of an updated management table. In this example, the management table manages the stroboscope information of the three slave stroboscopes with the slave IDs 1, 2, and 3, and the row of the table in which the slave ID is 1 contains the information about the representative slave itself. The charge information indicates the light emission preparation level of the slave stroboscope; in particular, if the charge voltage is greater than or equal to a predetermined charge voltage, a data value of "1" is set, indicating that light emission is possible, and a data value of "0" is set if the charge voltage is too low for light emission. The information on the remaining battery charge has four levels, with "3" indicating a sufficient remaining charge level, "2" indicating that the remaining charge level is at least 50%, "1" indicating the battery will soon run out, and "0" indicating no remaining charge.

In this embodiment, the representative slave is notified of the stroboscope information of each slave stroboscope at various timings, such as, when the slave stroboscope receives the first beacon after the slave stroboscope establishes a link with the master stroboscope MS1, and when the stroboscope information is updated. In this way, by limiting the timings of notification, the communication traffic can be reduced within the network that constitutes the wireless multi-stroboscopic flash system. However, each slave stroboscope may also be configured to periodically notify the representative slave of the stroboscope information. As described above with reference to FIG. 6C, a beacon frame contains information about the slave IDs of the stroboscopes that have joined in the network. For this reason, upon receiving a beacon, each stroboscope can detect changes in the network configuration, such as the departure of any slave stroboscope, including the representative slave, and the connection of a new slave stroboscope. In this way, the representative slave can manage whether or not the latest stroboscope information has been obtained from all the slave stroboscopes that have joined in the network. In addition, if the representative slave has exited or departed from the wireless multi-stroboscopic flash system due to battery exchange or the like, the master stroboscope MS1 selects a new representative slave and gives a notification to each of the slave stroboscopes by way of a beacon.

The master stroboscope MS1 can detect the departure of any slave stroboscope by determining whether or not it can communicate with each of the slave stroboscopes. This determination can be made, for example, based on the presence or absence of a response to a beacon from the slave stroboscope. In this case, each slave stroboscope is configured to transmit a response to the master stroboscope MS1 upon receiving a beacon. If no response to a beacon is received from the slave stroboscope, the master stroboscope MS1 determines that communication is not possible with the slave stroboscope. In particular, if no response to a beacon is received from the representative slave, the master stroboscope MS1 newly selects another slave stroboscope as the representative slave.

The above-described processing for obtaining and managing the stroboscope information about each slave stroboscope by the representative slave is carried out independently from the control performed by the master stroboscope MS1. Accordingly, even when the master stroboscope MS1 has a relatively high processing load, for example, due to the user operating the camera to set functions of the master stroboscope MS1, the stroboscope information can be updated without the involvement of the master stroboscope MS1. As a specific example, in step S513, following a user instruction, the camera main body 100 transmits a setting command to set stroboscope functions to the master stroboscope MS1. Next, in step S514, the master stroboscope MS1 performs function settings based on the setting command. The representative slave can obtain and update stroboscope information in parallel with the operation performed in steps S513 and S514.

In step S515, the master stroboscope MS1 transmits a beacon again. In the camera main body 100, when preparation for shooting is started or stroboscope information is displayed by depression of the release button or operation of the GUI by the user, the camera main body 100 requests the stroboscope information from the master stroboscope MS1 in step S516. In step S517, the master stroboscope MS1, upon receiving the request for the stroboscope information, sends a stroboscope information request packet to the slave stroboscope SS1, now serving as the representative slave. In step S518, upon receiving the stroboscope information request packet, the slave stroboscope SS1 generates a stroboscope information packet by referring to the management table (FIG. 6B) and transmits the packet to the master stroboscope MS1. In step S519, upon obtaining the stroboscope information packet, the master stroboscope MS1 notifies the camera main body 100 of the stroboscope information of the slave stroboscopes along with its own stroboscope information via the interfaces 221 and 124. The configuration of the stroboscope information will be described below with reference to FIGS. 7A to 7C. Based on the received stroboscope information, the camera main body 100 performs various operations, such as displaying information on the TFT display unit 115 and controlling the emission of light.

In step S520, the camera main body 100 transmits a light emission control instruction to the master stroboscope MS1 according to a shooting operation performed by the user or the like. In step S521, based on the light emission control instruction from the camera main body 100, the master stroboscope MS1 sends the slave stroboscopes SS1, SS2, and SS3 a light emission instruction together with the parameters required for light emission. In step S522, the master stroboscope MS1 and the slave stroboscopes SS1, SS2, and SS3 emit light.

The configuration of the stroboscope information given by the master stroboscope MS1 to the camera main body 100X) will be described hereinafter with reference to FIGS. 7A to 7C. FIG. 7A shows the structure of a packet sent and received by the stroboscopes 200 and the camera main body 100 via the interfaces 124 and 221. This packet has a data length (2 bytes), a command (2 bytes), and data corresponding to the command (variable). The data length indicates the sum of the byte counts of the command and the data.

FIGS. 7B and 7C show examples of the stroboscope information given by the master stroboscope MS1 to the camera main body 100. In the example of FIG. 7B, the stroboscope information has a structure in which information about all the stroboscopes is integrated into a single piece of information. The charge information indicates "0," which represents an insufficient charge level even if only one stroboscope is insufficiently charged (i.e., unable to emit light), and indicates "1" if all the stroboscopes are ready to emit light. The information on the remaining battery charge shows the charge state of the stroboscope with the lowest remaining battery charge. Accordingly, even if only one of the stroboscopes is insufficiently charged, the camera main body 100 shoots by performing exposure control without using the stroboscopes. It should be noted that if a wireless multi-stroboscopic flash system has not been set up, the stroboscope information is generated based solely on the information about the stroboscopes 200 connected to the camera main body 100.

In the example of FIG. 7C, separate pieces of stroboscope information about all of the stroboscopes are transmitted. As the camera main body 100 can learn individual stroboscope information about each of the stroboscopes included in the wireless multi-stroboscopic flash system, more nuanced light emission control is possible. The item "GROUP" shown in FIG. 7C identifies a group of slaves selected from the plurality of slaves in the network so as to change the emission amount ratio among the slaves in each group. Any known method of photography using a group of stroboscopes may be used as required.

As described above, according to the first embodiment, the master stroboscope selects one of the slave stroboscopes as the representative slave and notifies each slave stroboscope of the representative slave. Each slave stroboscope, if not selected as the representative slave, sends the representative slave its own stroboscope information indicating its own state. The master stroboscope receives stroboscope information about each of the slave stroboscopes from the representative slave. This arrangement reduces the processing load of the master stroboscope.

It should be noted that in the foregoing description, the communication apparatus that serves as the master (master communication apparatus) and the communication apparatuses that serve as the slaves (slave communication apparatuses) are stroboscopes. However, the master communication apparatus and the slave communication apparatuses are not limited to stroboscopes, and for example, digital cameras or personal computers may also suffice for the purpose of the present invention. Accordingly, this embodiment is not limited to a wireless multi-stroboscopic flash system and can be applied to any communication system. Although stroboscope information is used as exemplary information to indicate the state of each slave (slave information) in this embodiment, slave information is not limited to stroboscope information; and any suitable information may be used as slave information depending on the types of the master communication apparatus and the slave communication apparatuses. Moreover, the master communication apparatus and the slave communication apparatuses do not have to be the same type of apparatus. For example, the master communication apparatus may be a digital camera while the slave communication apparatuses may be stroboscopes. Although communication in the network is wireless in the foregoing description, wire communication may also be used instead of wireless communication.

Second Embodiment

In the second embodiment, a configuration will be described in which one master stroboscope switches for use between two different wireless multi-stroboscopic flash systems each having a different network ID. In this embodiment, the basic configurations of the camera main body 100 and the stroboscopes 200 are similar to those of the first embodiment. Therefore, the following description mainly focuses on the differences from the first embodiment.

FIGS. 8A and 8B show configurations of wireless multi-stroboscopic flash systems according to the second embodiment. FIGS. 8A and 8B show one master stroboscope MS1 and six slave stroboscopes SS1, SS2, SS3, SS4, SS5, and SS6.

In FIG. 8A, the master stroboscope MS1 and three slave stroboscopes SS1, SS2, and SS3 join in a network whose network ID is 0001h, and constitute a first wireless multi-stroboscopic flash system. The remaining three slave stroboscopes SS4, SS5, and SS6 join in a network with a network ID of 0002h, which is not joined in by the master stroboscope MS1.

In FIG. 8B, one master stroboscope MS1 and three slave stroboscopes SS4, SS5, and SS6 join in a network whose network ID is 0002h and constitute a second wireless multi-stroboscopic flash system. The remaining three slave stroboscopes, SS1, SS2, and SS3, join in a network with a network ID of 0001h. which is not joined in by the master stroboscope MS1.

By setting 0001h or 0002h as the network ID on the master stroboscope MS1, the user can switch between the first wireless multi-stroboscopic flash system and the second wireless multi-stroboscopic flash system. A possible scenario in which one camera switches between the first and second wireless multi-stroboscopic flash systems for shooting is a case where the object includes a portion with a high reflectance. Examples of objects that may include a portion with a high reflectance are works of art, such as sliding doors and folding screens of Buddhist temples, which, when photographed, generally result in unstable exposure due to the light reflected from the portions with a high reflectance. To address this problem, for example, the first wireless multi-stroboscopic flash system is set to control the emission of light for the portion with a high reflectance while the second wireless multi-stroboscopic flash system is set to control the emission of light for the portion with a normal reflectance. Next, the single camera switches between the two wireless multi-stroboscopic flash systems for shooting so that two resultant images can be merged later to generate one image.

Referring now to FIG. 9, the sequence of processing in which the master stroboscope MS1 switches between the wireless multi-stroboscopic flash systems to obtain information of each of the slave stroboscopes will be described hereinafter. In FIG. 9, unless otherwise specified, the steps performed by each stroboscope 200 are performed by the stroboscope microcomputers 226 executing the control program. Additionally, unless otherwise specified, the steps performed by the camera main body 100 are performed by the camera microcomputer 101 executing the control program.

It is assumed that the network configuration at the start of the sequence of FIG. 9 is as depicted in FIG. 8A. Specifically, by virtue of sharing the same network ID of 0001h. one master stroboscope MS1 and three slave stroboscopes SS1, SS2, and SS3 currently constitute the first wireless multi-stroboscopic flash system. A network ID of 0002h is set for the other three slave stroboscopes SS4. SS5, and SS6.

In step S901, the slave stroboscope SS4 broadcasts its own stroboscope information. In steps S902 and S903, the slave stroboscopes SS5 and SS6, for which the network ID of 0002h is set, receive the stroboscope information broadcasted by the slave stroboscope SS4 and update the stroboscope information they manage with the received information. In steps S904 to S906, the same operation as in steps S901 to S903 is performed with respect to the stroboscope information broadcasted by the slave stroboscope SS5. In steps S907 to S909, the same operation as in steps S901 to S903 is performed with respect to the stroboscope information broadcasted by the slave stroboscope SS6. In this way, according to this embodiment, even slave stroboscope maintains stroboscope information of all the slave stroboscopes. It should be noted that the slave stroboscopes SS4, SS5, and SS6 may broadcast stroboscope information either periodically or upon the stroboscope information being updated.

In step S910, the master stroboscope MS1 transmits a beacon. The slave stroboscopes SS1, SS2, and SS3, which have established a link with the master stroboscope MS1, receive the beacon. As in the first embodiment, a beacon is periodically and repeatedly transmitted.

In step S911, the user changes the network ID of the master stroboscope MS1 from 0001h to 0002h by operating the operation unit 11*l* of the camera main body 100. Once this operation is performed, the camera main body 100 notifies the master stroboscope MS1 of the new network ID (i.e., 0002h) via the interfaces 124 and 221. In step S912, the master stroboscope MS1 transmits a network change packet according to the notification of change in the network ID received from the camera main body 100. In response to the receipt of the network change packet, the slave stroboscopes SS1, SS2, and SS3 depart from the first wireless multi-stroboscopic flash system. The slave stroboscopes SS1, SS2, and SS3, which have departed from the first wireless multi-stroboscopic flash system, share stroboscope information among the stroboscopes with the network ID of 0001h in the same manner as in steps S901 to S909 described above.

In step S916, the master stroboscope MS1 transmits a beacon that contains the new network ID after the change. The beacon frame (FIG. 6C) contains the network ID after the change, which is 0002h in this case. This beacon is received by the slave stroboscopes SS4, SS5, and SS6, which have the network ID of 0002h. In step S913, in response to the receipt of the beacon, the stroboscope SS4 transmits a connection request packet to the master stroboscope MS1 and establishes a link with the master stroboscope MS1. In steps S914 and S915, the same operation as in step S913 is performed with respect to the slave stroboscopes SS5 and SS6, respectively. This establishes the second wireless multi-stroboscopic flash system. It should be noted that the second wireless multi-stroboscopic flash system is established in the same procedure as in the first embodiment.

In the camera main body 100, when preparation for shooting is started or stroboscope information is displayed by a press of the release button or operation of the GUI by the user, the camera main body 100 requests the stroboscope information from the master stroboscope MS1 in step S917. In step S918, the master stroboscope MS1, upon receiving the request for the stroboscope information, sends a stroboscope information request packet to the slave stroboscope SS4, which serves as the representative slave. Unlike the first embodiment, the slave stroboscopes SS4, SS5, and SS6 all share the stroboscope information in this embodiment, and therefore it is not necessary for the master stroboscope MS1 to notify the slave stroboscopes SS4. SS5, and SS6 of the representative slave. Of course, as in the first embodiment, the notification using a beacon may also be made. In step S919, upon receiving the stroboscope information request packet, the slave stroboscope SS4 generates a stroboscope information request packet by referring to the management table and transmits the packet to the master stroboscope MS1. This and the subsequent steps are the same as those of the first embodiment (see steps S520-S522 of FIG. 5B).

It should be noted that it is assumed that requests for stroboscope information are also made to the representative slave in step S918 as in the first embodiment. In this embodiment, however, all the slave stroboscopes share stroboscope information as described in connection with steps S901-S909. Accordingly, the master stroboscope MS1 may alternatively be configured to request stroboscope information not just from the representative slave but from any of the slave stroboscopes SS4, SS5, and SS6.

Figure 10A:
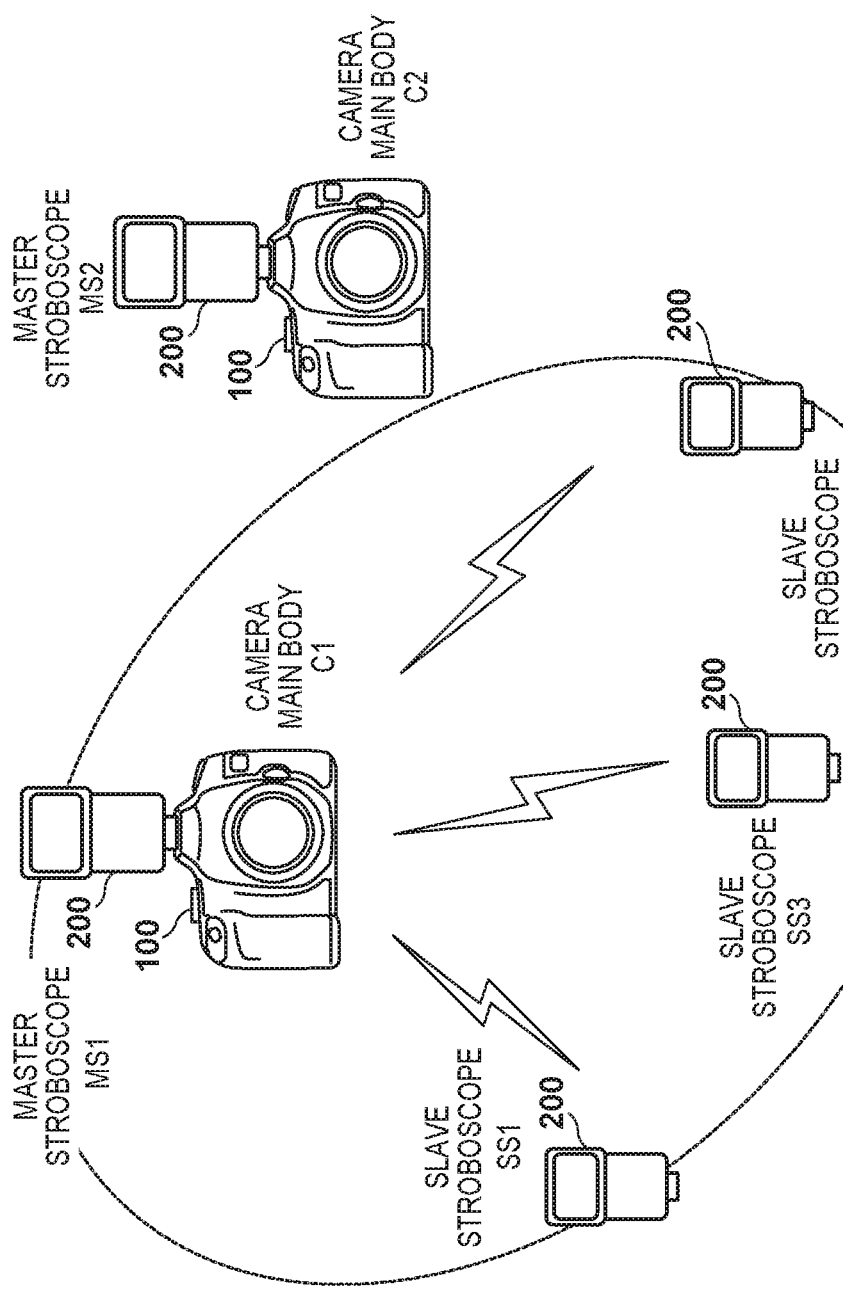
FIG. 10A is a diagram showing a modified example of the wireless multi-stroboscopic flash system according to the second embodiment.
Figure 10B:
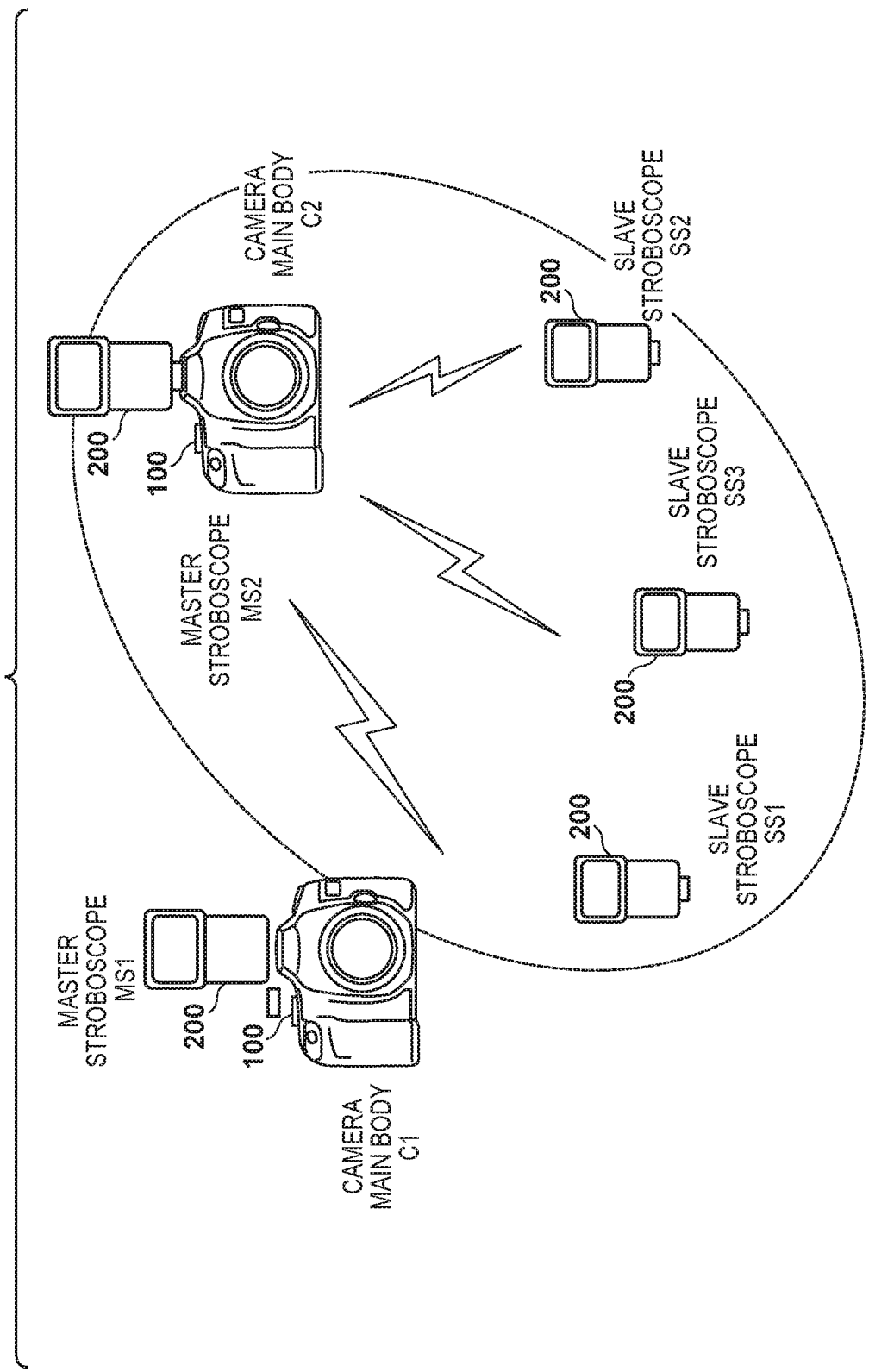
FIG. 10B is a diagram showing a modified example of the wireless multi-stroboscopic flash system according to the second embodiment.

In this embodiment, a configuration has been described in which one master stroboscope MS1 uses two wireless multi-stroboscopic flash systems each having a different network ID while switching therebetween. As shown in FIGS. 10A and 10B, however, this embodiment can also be applied to the case in which two master stroboscopes MS1 and MS2 establish the same wireless multi-stroboscopic flash system.

As described above, according to the second embodiment, each of the slave stroboscopes that join in the same network broadcasts its own stroboscope information and receives stroboscope information broadcasted by the other slave stroboscopes. If the master stroboscope requests stroboscope information from any of the slave stroboscopes, the slave stroboscope that receives the request transmits the stroboscope information about each slave stroboscope to the master stroboscope. This arrangement reduces the processing load of the master stroboscope. Even in the case where the master stroboscope switches among a plurality of wireless multi-stroboscopic flash systems, as the slave stroboscopes share stroboscope information in advance, the master stroboscope can quickly obtain stroboscope information.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-Ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-133981, filed Jul. 7, 2017, which is hereby incorporated by reference herein in its entirety.

What is claimed is:

1. A master communication apparatus, comprising at least one processor and/or at least one circuit which functions as:
   a selection unit configured to select a representative slave from a plurality of slave communication apparatuses;
   a notification unit configured to notify the plurality of slave communication apparatuses of the representative slave, wherein each of the plurality of slave communication apparatuses is configured to: when not acting as the representative slave, transmit state information that indicates a state to the representative slave, and when acting as the representative slave, manage state information received from each other slave communication apparatus of the plurality of slave communication apparatuses;

a sending unit configured to send a state information request to the representative slave;

a reception unit configured to receive, from the representative slave as a response to the state information request, the state information of the plurality of the slave communication apparatuses including the state information from each of the other slave communication apparatuses of the plurality of slave communication apparatuses previously received and managed by the representative slave before the state information request is sent to the representative slave by the sending unit; and a transmission unit configured to transmit a control signal for controlling the plurality of slave communication apparatuses based on the state information.

2. The master communication apparatus according to claim 1, wherein the at least one processor and/or the at least one circuit further function as an establishing unit configured to establish connection with each of the plurality of slave communication apparatuses, wherein the selection unit selects the representative slave based on an order of establishment of the connection with the plurality of slave communication apparatuses by the establishing unit.

3. The master communication apparatus according to claim 2, wherein the selection unit selects as the representative slave the slave communication apparatus with which connection was first established by the establishing unit.

4. The master communication apparatus according to claim 1, wherein the at least one processor and/or the at least one circuit further function as a determination unit configured to determine whether or not communication is possible with the representative slave, wherein when the communication is not possible with the representative slave, the selection unit selects another slave communication apparatus as a new representative slave.

5. The master communication apparatus according to claim 4, wherein the determination unit repeatedly transmit a beacon, and determines that communication is not possible with the representative slave when no reply to the beacon is received from the representative slave.

6. The master communication apparatus according to claim 5, wherein the notification unit notifies the plurality of slave communication apparatuses of the representative slave by including information that indicates the representative slave in the beacon.

7. The master communication apparatus according to claim 1, wherein the master communication apparatus is a stroboscope or a digital camera, and each of the plurality of slave communication apparatuses is a stroboscope or a digital camera.

8. The master communication apparatus according to claim 1, wherein the master communication apparatus and the plurality of slave communication apparatuses are wireless communication apparatuses.

9. A slave communication apparatus comprising at least one processor and/or at least one circuit which functions as:

a first reception unit configured to receive a notification from a master communication apparatus, the notification indicating a representative slave selected from a plurality of slave communication apparatuses including the slave communication apparatus;

a second reception unit configured to, when the slave communication apparatus is selected as the representative slave, receive, from each other slave communication apparatus of the plurality of slave communication apparatuses, state information that indicates a state;

a management unit configured to manage the state information received from each other slave communication apparatus of the plurality of slave communication apparatuses when the slave communication apparatus is selected as the representative slave;

a third reception unit configured to receive a state information request from the master communication apparatus when the slave communication apparatus is selected as the representative slave; and a transmission unit configured to transmit, as a response to the state information request, the state information of the plurality of slave communication apparatuses, including the state information from each of the other slave communication apparatuses of the plurality of slave communication apparatuses previously received and managed before the state information request is received from the master communication apparatus by the third reception unit, to the master communication apparatus when the slave communication apparatus is selected as the representative slave, and transmit state information of the slave communication apparatus to the representative slave when the slave communication apparatus is not selected as the representative slave, wherein the slave communication apparatus operates upon receiving a control signal based on the state information from the master communication apparatus.

10. The slave communication apparatus according to claim 9, wherein the master communication apparatus is a stroboscope or a digital camera, and each of the plurality of slave communication apparatuses is a stroboscope or a digital camera.

11. The slave communication apparatus according to claim 9, wherein the master communication apparatus and the plurality of slave communication apparatuses are wireless communication apparatuses.

12. A communication system comprising:

a master communication apparatus, comprising at least one processor and/or at least one circuit which functions as:

a selection unit configured to select a representative slave from a plurality of slave communication apparatuses;

a notification unit configured to notify the plurality of slave communication apparatuses of the representative slave, wherein each of the plurality of slave communication apparatuses is configured to: when not acting as the representative slave, transmit state information that indicates a state to the representative slave, and when acting as the representative slave, manage state information received from each other slave communication apparatus of the plurality of slave communication apparatuses;

a sending unit configured to send a state information request to the representative slave;

a reception unit configured to receive, from the representative slave as a response to the state information request, the state information of the plurality of the slave communication apparatuses including the state information from each of the other slave communication apparatuses of the plurality of slave communication apparatuses previously received and managed by the representative slave before the state information request is sent to the representative slave by the sending unit; and a transmission unit configured to transmit a control signal for controlling the plurality of slave communication apparatuses based on the state information, wherein each of the plurality of slave communication apparatuses comprises at least one processor and/or at least one circuit which functions as:

a first reception unit configured to receive a notification from the master communication apparatus, the notification indicating the representative slave selected from the plurality of slave communication apparatuses including the slave communication apparatus;

a second reception unit configured to, when the slave communication apparatus is selected as the representative slave, receive, from each other slave communication apparatus of the plurality of slave communication apparatuses, the state information that indicates the state;

a management unit configured to manage the state information received from each other slave communication apparatus of the plurality of slave communication apparatuses when the slave communication apparatus is selected as the representative slave;

a third reception unit configured to receive the state information request from the master communication apparatus when the slave communication apparatus is selected as the representative slave; and a transmission unit configured to transmit, as a response to the state information request, the state information of the plurality of slave communication apparatuses, including the state information from each of the other slave communication apparatuses of the plurality of slave communication apparatuses previously received and managed before the state information request is received from the master communication apparatus by the third reception unit, to the master communication apparatus when the slave communication apparatus is selected as the representative slave, and transmit state information of the slave communication apparatus to the representative slave when the slave communication apparatus is not selected as the representative slave, wherein the slave communication apparatus operates upon receiving a control signal based on the state information from the master communication apparatus.

13. A control method executed by a master communication apparatus, comprising:

selecting a representative slave from a plurality of slave communication apparatuses;

notifying the plurality of slave communication apparatuses of the representative slave, wherein each of the plurality of slave communication apparatuses is configured to, when not acting as the representative slave, transmit state information that indicates a state to the representative slave, and when acting as the representative slave, manage state information received from each other slave communication apparatus of the plurality of slave communication apparatuses;

sending a state information request to the representative slave;

receiving, from the representative slave as a response to the state information request, the state information of the plurality of the slave communication apparatuses including the state information from each of the other slave communication apparatuses of the plurality of slave communication apparatuses previously received and managed by the representative slave before the state information request is sent to the representative slave; and transmitting a control signal for controlling the plurality of slave communication apparatuses based on the state information.

14. A control method executed by a slave communication apparatus, comprising:

receiving a notification from a master communication apparatus, the notification indicating a representative slave selected from a plurality of slave communication apparatuses including the slave communication apparatus;

when the slave communication apparatus is selected as the representative slave, receiving, from each other slave communication apparatus of the plurality of slave communication apparatuses, state information that indicates a state;

managing the state information received from each other slave communication apparatus of the plurality of slave communication apparatuses when the slave communication apparatus is selected as the representative slave;

receiving a state information request from the master communication apparatus when the slave communication apparatus is selected as the representative slave; and transmitting, as a response to the state information request, the state information of the plurality of slave communication apparatuses, including the state information from each other slave communication apparatus of the plurality of slave communication apparatuses previously received and managed before the state information request is received from the master communication apparatus, to the master communication apparatus when the slave communication apparatus is selected as the representative slave, and transmitting state information of the slave communication apparatus to the representative slave when the slave communication apparatus is not selected as the representative slave, wherein the slave communication apparatus operates upon receiving a control signal based on the state information from the master communication apparatus.

* * * * *